United States Patent

Timperman

[15] 3,638,884

[45] Feb. 1, 1972

[54] THRUST VECTORING LOUVER CASCADE

[72] Inventor: Eugene L. Timperman, Cincinnati, Ohio

[73] Assignee: The United States of America as represented by the Secretary of the Air Force

[22] Filed: Sept. 15, 1969

[21] Appl. No.: 862,627

[52] U.S. Cl. ........................................244/12 D, 244/12 B
[51] Int. Cl. ..............................................B64c 15/08
[58] Field of Search ..............................................244/12, 23

[56] References Cited

UNITED STATES PATENTS 3,131,873  5/1964  Sanders ................................244/12 B
3,179,353  4/1965  Peterson ................................244/12 B
3,369,773  2/1968  Erwin ....................................244/12 B

*Primary Examiner*—Milton Buchler
*Assistant Examiner*—Steven W. Weinrieb
*Attorney*—Derek P. Lawrence, E. S. Lee, III, Lee H. Sachs, Frank L. Neuhauser, Oscar B. Waddell and Joseph B. Forman

[57]  ABSTRACT

A thrust vectoring louver cascade is provided for a lift fan employed in the propulsion of V/STOL Aircraft. The V-shaped louvers of the cascade are pivoted about their apexes to provide increased mass flow of the propulsive gas stream, particularly when it is vectored to angle its output thrust from the vertical.

2 Claims, 4 Drawing Figures

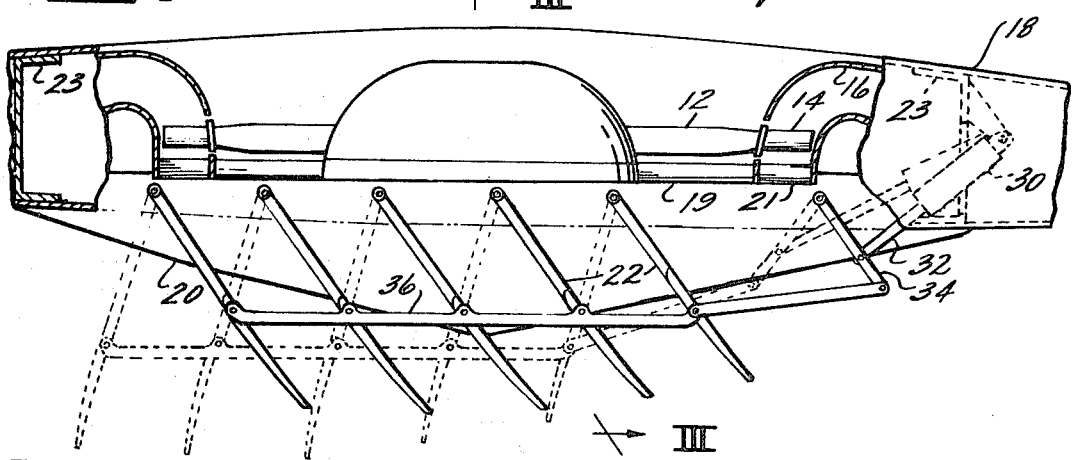
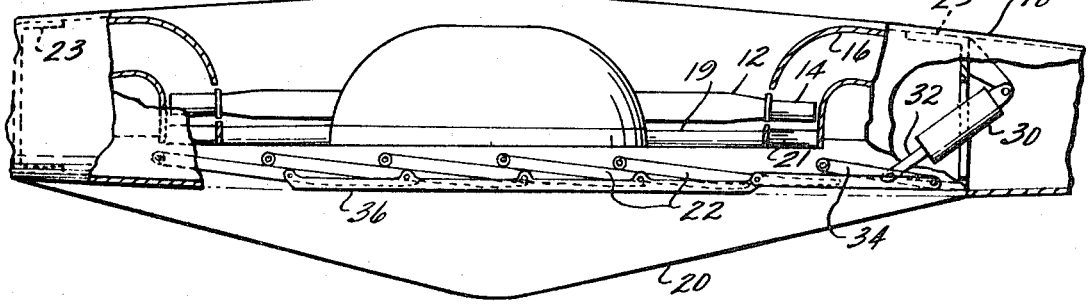
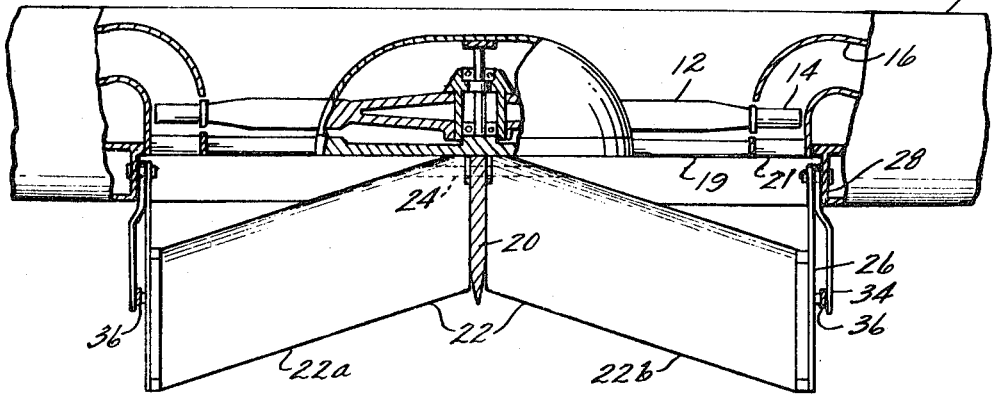
INVENTOR.
EUGENE L. TIMPERMAN

INVENTOR.
EUGENE L. TIMPERMAN
BY
ATTORNEY

THRUST VECTORING LOUVER CASCADE

The present invention relates to improvements in thrust vectoring louver systems employed in the propulsion of aircraft having vertical or short takeoff and landing (V/STOL) capabilities. The invention herein described was made in the course of or under a contract, or a subcontract thereunder, with the United States Department of the Air Force.

V/STOL aircraft require vertical thrust which can preferably be vectored to provide an angled thrust component when the aircraft is transitioned to and from forward flight. A particularly effective propulsion system employing lift fans mounted in the wings of an aircraft is disclosed in U.S. Pat. No. 3,176,934, and the present invention will be described with references to its advantages in that environment.

In meeting the requirements of a thrust vectoring system, there are two primary considerations, in addition to the normal requirements such as low weight and reliability, of aircraft systems. These considerations are maintaining maximum flow of the propulsive gas stream when it is vectored to provide an angled thrust and providing a smooth surface at the lift fan outlet when it is shut down during high speed forward flight.

The cascade of straight louvers shown in U.S. Pat. No. 3,176,934 progressively reduces the exit flow area of the lift as the louvers are pivoted to vector the thrust from its normal vertical direction. This results in greatly reduced effective thrust in the rather critical operation of transitioning to and from forward flight when it is desired to have a thrust component vectored from the vertical by as much as 30° or more.

This same problem is recognized and a workable solution proposed in U.S. Pat. No. 3,369,773. In that patent, the louvers are V-shaped and pivoted about hinge axes at their outer ends to drop the apexes of the louvers away from the fan discharge. This has the result of increasing flow area in the vectoring positions of the louvers.

The object of the present invention is to increase mass flow and thrust of the vectored discharge of a lift fan or similar device employed in V/STOL aircraft.

Another object is to more fully realize the potential of V-shaped louvers in a thrust vectoring cascade.

The above objects, in their broader aspects, are attained by providing a cascade of V-shaped louvers at the discharge of a propulsive gas stream. The louvers are pivoted at their apexes to deflect the gas stream to a desired angle with their outer ends spaced from the gas stream discharge to minimize the blockage of flow therefrom.

Advantageously this cascade is employed at the discharge of a lift fan mounted in an airfoil, aircraft structure. The louvers are so pivoted to a shingled relationship flush with the lower surface of the airfoil structure when the lift fan is shut down.

The lift fan may include a central strut for carrying thrust loadings into the aircraft structure. Preferably the louvers are mounted on this strut at their apexes. Actuator means connected to each of the outer ends of the louvers are then employed to pivot the louvers and vector the thrust of the lift fan as required for operation of the aircraft.

The above and other related objects and features of the invention will be apparent from a reading of the following description of the disclosure found in the accompanying drawings and the novelty thereof pointed out in the appended claims.

In the drawings:

FIG. 1 is a side section, taken on line I—I in FIG. 3, of the present louver cascade deployed to vector the discharge of a lift fan;

FIG. 2 is the same as FIG. 1 except that the louver cascade is closed for high-speed forward flight;

FIG. 3 is a section taken on line III—III in FIG. 1; and

Figure 4:
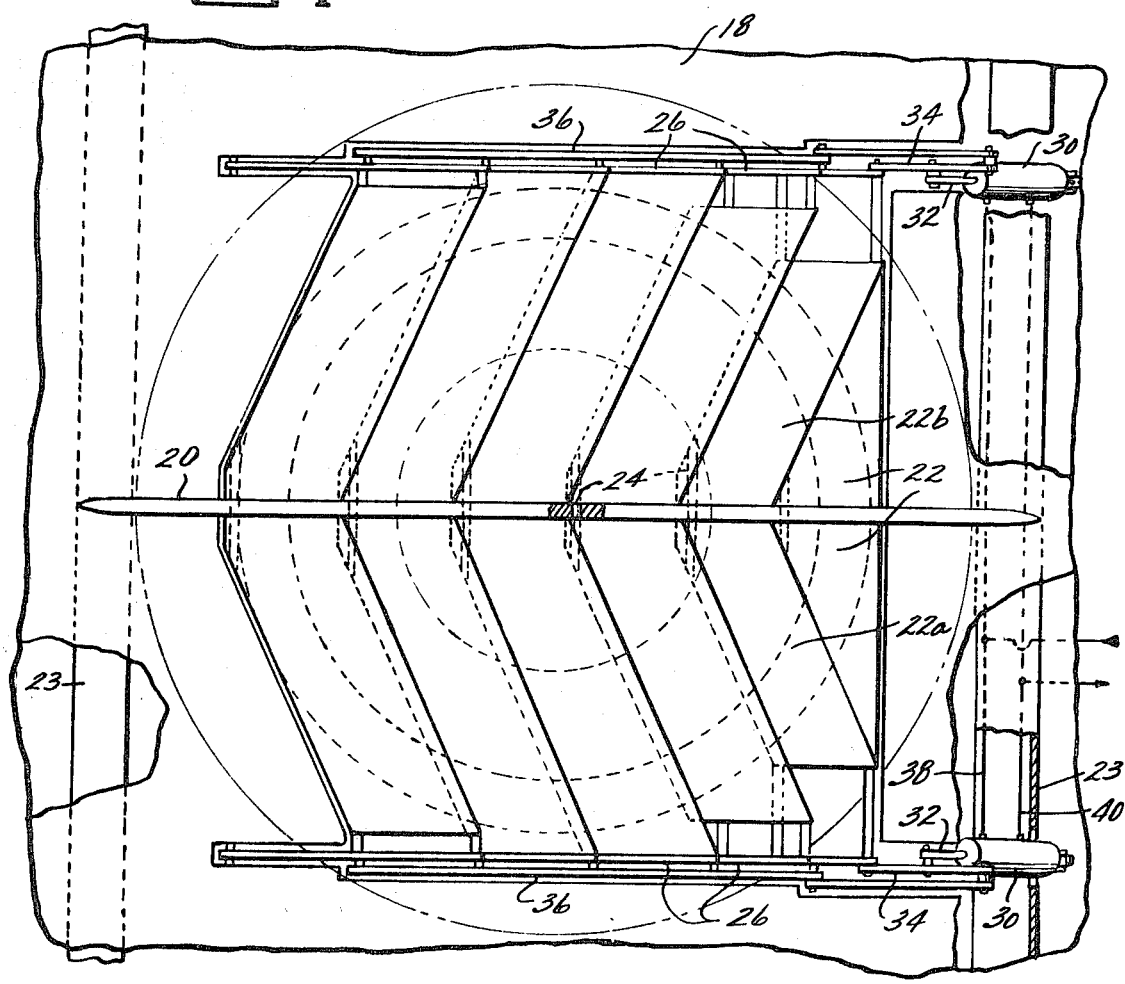
FIG. 4 is a bottom view of the louver cascade in its closed position.

The lift fan 10 (FIG. 1) comprises a rotor having fan blades 12. Turbine buckets 14 are attached to the outer ends of the blades 12, providing a tip turbine which is driven by a hot gas stream introduced into a scroll 16. These components are mounted within the wing of an aircraft indicated at 18. The lift fan thus discharges an inner stream of pressurized air and an outer concentric hot gas stream which are directed in a downward vertical direction by vanes 19 and 21.

One of the primary supports for the lift fan rotor is a strut 20 which spans the fan discharge and is aligned in the direction of normal forward flight of the aircraft. The strut 20 is attached to spars 23 which extend spanwise of the wing 18 and transmits the thrust loading of the rotor thereto. This strut 20 is advantageously employed in mounting the louver cascade now to be described.

A plurality of V-shaped louvers 22 are pivotally mounted at their apexes on the central strut 20. Preferably, each louver comprises halves 22a and 22b joined by an axle 24 which is journaled on the strut 20 closely adjacent to the exit plane of the lift fan which is defined by the lower surface of the wing 18. The outboard ends of the louver halves 22a and 22b are respectively supported by links 26. The links 26 are pivotally mounted on rails 28 within the wing structure and outside the propulsive stream discharged. The links 26 are connected to the louver halves, through collars, as necessary, to account for differences in the lengths of the louvers. The pivot axes for the links 26 are aligned respectively with the axes of the axles 24 for the louvers to which they are connected.

Actuators 30 are pivotally mounted on the wing structure with their piston rods 32 connected respectively to the links 34. The links 34 are pivotally mounted on the rails 28 and to links 36 which respectively join the louver halves in a parallel linkage through connections with the supporting links 26. The actuators 30 are connected to common pressurization and drain lines 38, 40 to synchronize their movements and equalize their forces on the two sets of louver halves. Other synchronization means can also be employed to assure equal forces from the preferred use of a two-actuator system to obtain minimum stress loadings. The actuators may be controlled to swing the louvers to any desired position for thrust vectoring (note the broken line position of FIG. 1) or close the louvers when the lift fan is shut down (FIGS. 2 and 4).

The described systems provides mechanical and structural advantages which enhance the aerodynamic advantages of the described louver cascade, as will be further appreciated by reference to FIGS. 1, 3 and 4. Mass flow of the propulsive gas stream through the fan is greatest at or adjacent its outer periphery. By swinging the ends of the V-shaped louvers away from the fan discharge as described, their blockage effect is greatly reduced and significantly greater mass flow can pass through the fan, particularly when the louvers are angled to vector the thrust of the engine from its normal, vertical direction. Increased mass flow, of course, provides a greater vector thrust output from the engine. Another factor to be considered is that the outer ends of the louvers, in being swung downwardly, are spaced from the tip turbine discharge so that their exposure to hot gases is reduced.

The above advantages of increased mass flow and thrust are in addition to increases which are obtained by sweeping the louvers to increase the flow area through the louver cascade as is taught in the above-referenced Erwin patent.

FIGS. 2 and 4 illustrate the closed position of the louvers when the lift fan is shut down during high speed forward flight. The lower surface of the wing is provided with an opening permitting the louvers to be pivoted to a shingled condition substantially flush with the wing surface. The wing opening approximates the composite outline of the louver system in its shingled condition so as to provide a substantially clean aerodynamic surface. Openings provided for the actuators 30 and their linkage connections may also be closed by pivotal doors for high speed forward flight.

While a preferred embodiment has been described, variations thereto will occur to those skilled in the art within the scope of the present inventive concepts which are delineated by the following claims.

Having thus described the invention, what is claimed as novel and desired to be secured by Letters Patent of the United States is:

1. In combination with the discharge for a propulsive gas stream, a thrust vectoring louver cascade comprising;
    a plurality of V-shaped louvers;
    means for pivotally mounting the louvers about parallel axes passing through their respective apexes, said axes lying in a plane generally normal to and adjacent the gas stream discharge;
    a lift fan for generating the propulsive gas stream to be discharged and including a tip turbine having a hot gas stream discharge peripherally of the lift fan discharge;
    an airfoil, aircraft structure having the gas stream discharge in its lower surface;
    said louvers having a stowed position in shingled relation substantially flush with the lower surface of the aircraft structure;
    a central strut spanning the lift fan discharge; said strut being supported at its opposite ends by the aircraft structure and generally aligned in the direction of forward flight of the aircraft;
    the louvers being formed by halves respectively disposed on opposite sides of said strut, which are joined by axles journaled on said strut;
    means for pivoting said louvers from said stowed position to a position with the outer ends of the louvers a greater distance from the lift fan than the apexes of the louvers, for vectoring the propulsion gas stream with a minimum blockage of its flow area;
    said pivot means including a link, supporting the outer end of each louver half, which is pivoted from said aircraft structure about an axis aligned with the axle axis for the respective V-shaped louver.

2. A combination as in claim 1 wherein the pivoting means comprise,
    links respectively connecting the outer ends of each louver half,
    a pair of actuators respectively connected to the outer ends of each louver half through said links, and
    means for exerting equal actuator forces upon each louver half.

* * * * *